(12) United States Patent
Widenhorn et al.

(10) Patent No.: US 7,880,780 B2
(45) Date of Patent: Feb. 1, 2011

(54) SENSOR APPARATUS AND METHOD FOR NOISE REDUCTION

(76) Inventors: Ralf Widenhorn, 2132 NE. 13th Ave., Portland, OR (US) 97212; Erik Bodegom, 2315 NE. 32nd Ct., Portland, OR (US) 97212; Richard L. Berry, 22614 N. Santiam Hwy., Lyons, OR (US) 97358; Armin Rest, Casilla 603, Colina el Pino S/N, La Serena (CL)

( * ) Notice: Subject to any disclaimer, the term of this patent is extended or adjusted under 35 U.S.C. 154(b) by 638 days.

(21) Appl. No.: 11/659,419

(22) PCT Filed: Aug. 3, 2005

(86) PCT No.: PCT/US2005/027504
§ 371 (c)(1),
(2), (4) Date: Feb. 2, 2007

(87) PCT Pub. No.: WO2006/017544
PCT Pub. Date: Feb. 16, 2006

(65) Prior Publication Data
US 2008/0309802 A1 Dec. 18, 2008

(51) Int. Cl.
*H04N 9/64* (2006.01)

(52) U.S. Cl. .................................................. 348/243
(58) Field of Classification Search ......... 348/243–245, 348/294, 345, 347, 349; 250/E27.162, 208.1
See application file for complete search history.

(56) References Cited

U.S. PATENT DOCUMENTS

| | | | |
|---|---|---|---|
| 6,774,942 B1 * | 8/2004 | Salcedo et al. | 348/243 |
| 6,822,679 B1 * | 11/2004 | Kulhalli et al. | 348/246 |
| 6,829,007 B1 * | 12/2004 | Bilhan et al. | 348/243 |
| 7,545,418 B2 * | 6/2009 | Beck et al. | 348/241 |

* cited by examiner

*Primary Examiner*—Tuan Ho
(74) *Attorney, Agent, or Firm*—John R. Thompson; Stoel Rives LLP

(57) ABSTRACT

A sensor including an array of sensor elements generates an image responsive to electromagnetic radiation exposure. The sensor reads coordinates for predetermined hot sensor elements and calculates a dark count for each hot sensor element. The sensor determines a temperature indicator based on the dark count for the hot sensor elements and calculates the dark count for all sensor elements based on the temperature indicator. Based on the dark count the sensor is able to compensate for dark current.

29 Claims, 16 Drawing Sheets

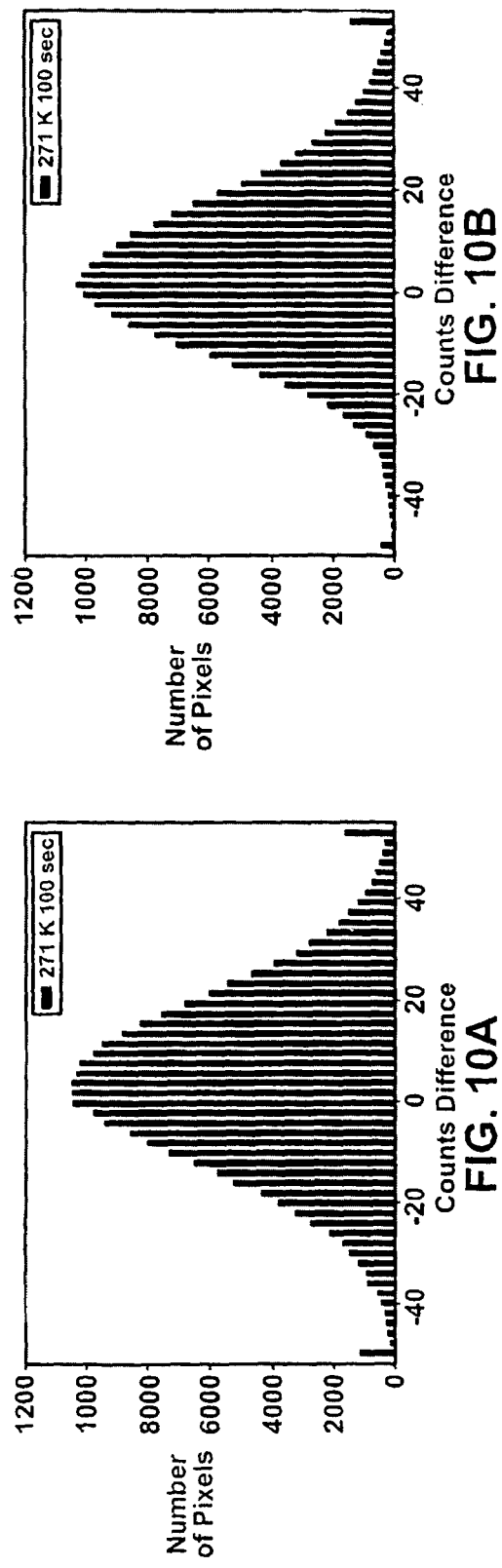
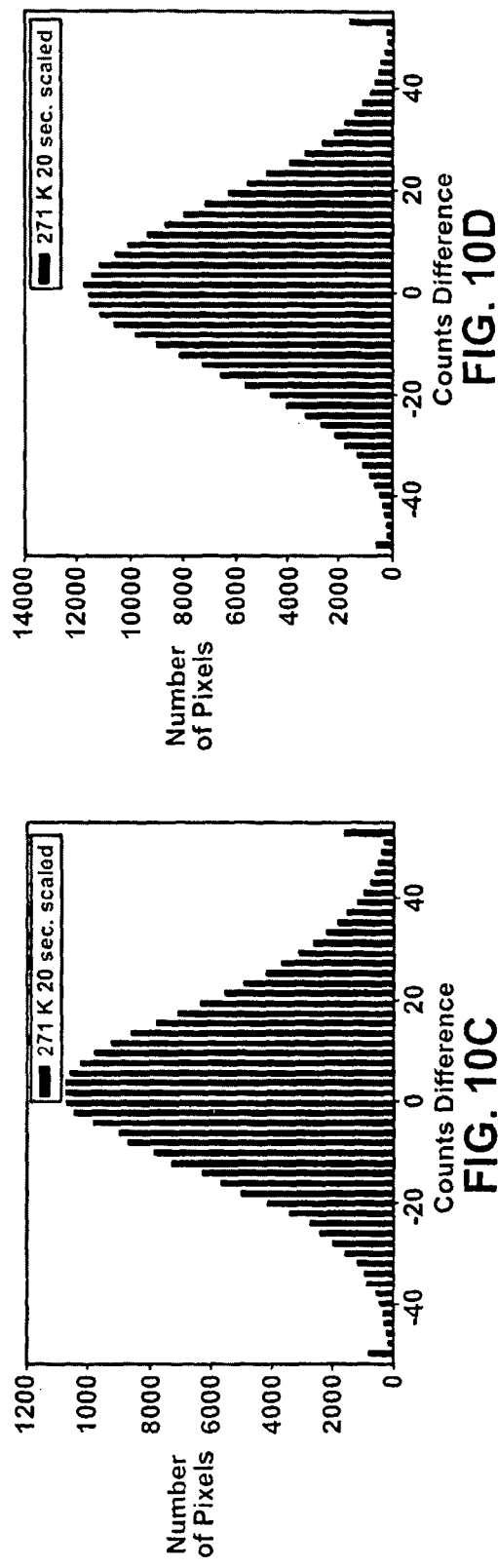
FIG. 10A
FIG. 10B
FIG. 10C
FIG. 10D

SENSOR APPARATUS AND METHOD FOR NOISE REDUCTION

TECHNICAL FIELD

The invention relates generally to the field of image sensors and, more specifically, image sensors employing techniques for dark current compensation.

BACKGROUND OF THE INVENTION

An image sensor includes an array of sensor elements to receive and detect electromagnetic radiation. The sensor elements generate electronic signals in response to the electromagnetic radiation with amplitudes indicative of the intensity. A sensor element may include a semiconductor device such as a charge-coupled device (CCD), photodiode array, charge injection device, or metal oxide semiconductor (CMOS). CCD sensor arrays are a proven technology that have been commercial available for many years. A CMOS sensor element includes multiple transistors for each pixel. An active pixel sensor (APS) array is a CMOS sensor array with radiation sensing circuitry and active circuitry designed in each pixel. Active circuitry includes interconnected transistors that are in an opaque area that is not used for radiation sensing. Accordingly, each pixel includes radiation sensitive and non-radiation sensitive circuitry.

Dark current, also referred to as noise, is a thermal excitation in a sensor element that is not generated by received electromagnetic radiation. The thermal excitation releases electrons into individual sensor elements in a sensor device. The thermally released electrons are collected along with electrons that are released by photon excitation. A sensor is not able to distinguished from thermally excited electrons and electrons released by incoming photons. This creates element values that are too high when the image is read out of a sensor device.

All image sensors are subject to dark current. However, in most digital applications the amount of photo-electrically generated electrons is overwhelming compared to the number of thermally released electrons. Thus, dark current is often a mostly ignored phenomenon. In some circumstances, such as astronomical photography, the amount of incoming light is usually quite small. This makes it necessary to take long exposure photographs. With both consumer cameras and astronomical cameras, the low light levels combined with the long exposure times puts the dark current on an order of magnitude with the photon excited current thereby making dark current a significant factor.

Correcting for dark current involves taking a dark frame image, which is an image with the shutter closed. The sensor element values of the dark frame are then subtracted from the original image to obtain the true value. The additional steps of taking a dark frame and then subtracting the dark current values are tedious and are subject to error. It would therefore be advantageous to provide accurate dark current correction without additional user action.

BRIEF DESCRIPTION OF THE DRAWINGS

Non-limiting and non-exhaustive embodiments of the present invention are described in the Figures, in which:

FIGS. 10A-10D are histograms illustrating count differences between dark frames.

DETAILED DESCRIPTION OF PREFERRED EMBODIMENTS

Figure 1:
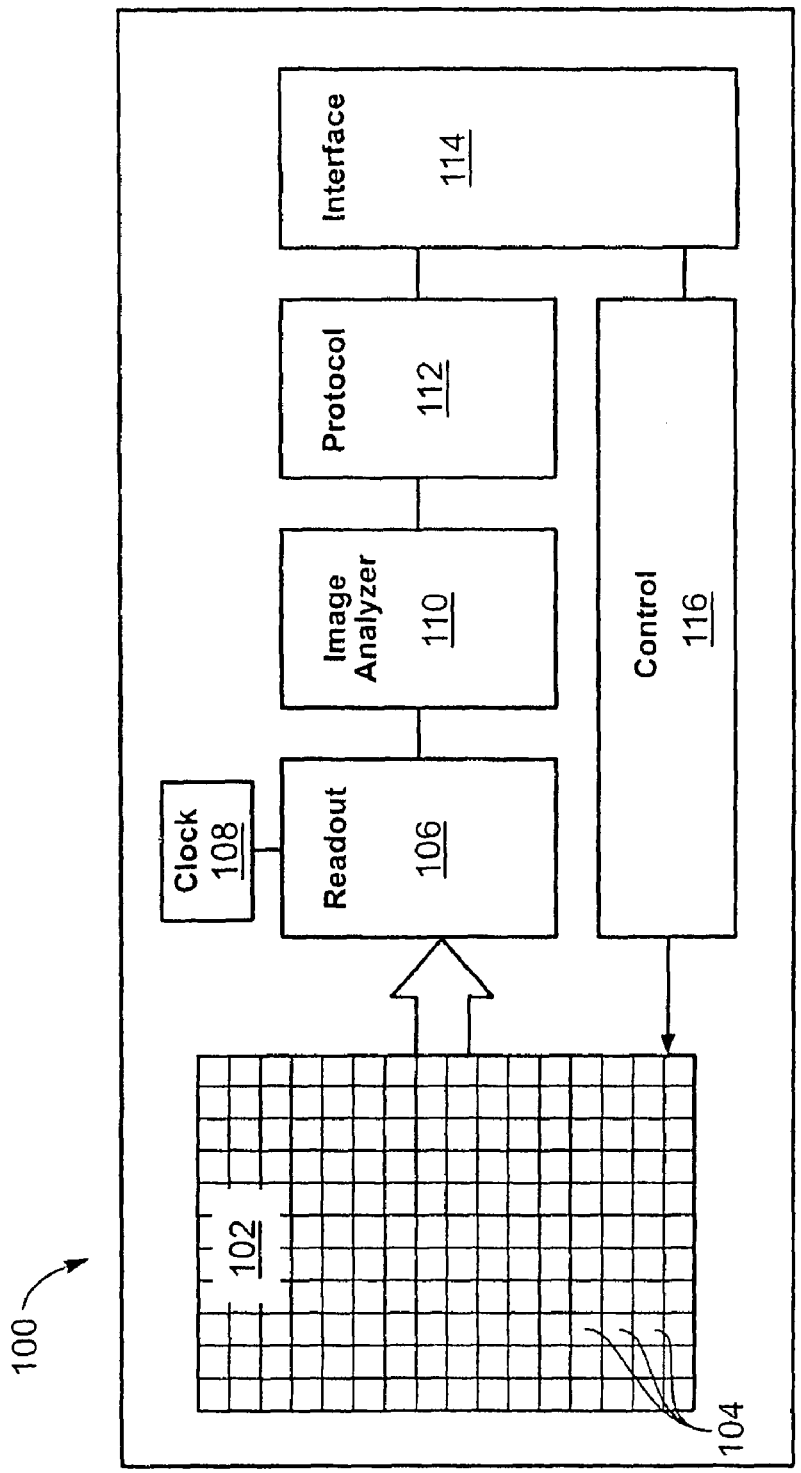
FIG. 1 is a block diagram of a sensory array.

Reference is now made to the figures in which like reference numerals refer to like elements. The described features, structures, or characteristics may be combined in any suitable manner in one or more embodiments. Those skilled in the art will recognize that the invention can be practiced without one or more of the specific details, or with other methods, components, materials, etc. In other instances, well-known structures, materials, or operations are not shown or not described in detail to avoid obscuring aspects of the invention.

Dark current changes based on temperature for individual sensor elements may be used to calculate artificial dark frames. However, for many sensors the exact sensor array temperature is not precisely known. Some sensors do not contain any temperature regulation and the chip temperature varies more or less with the ambient temperature. Other sensors, where low dark current levels are of greater importance, may contain a cooling system.

In thermoelectrically cooled systems the control circuit that operates a Peltier-element cycles the temperature above and below a mean temperature. Usually, the temperature sensor measures not the actual array temperature but the temperature of the cold finger underneath the array. The array temperature can change due to heat generated when the array is clocked rapidly. All those elements can lead to an uncertainty in the actual array temperature.

Actual knowledge of the temperature of a sensor array is not required for dark current correction. For a given exposure time, the dark current of each sensor element is characteristic of a specific temperature. Sensor elements that contain the highest concentration of impurities result in the largest amount of dark current and behave in a predictable and quantifiable manner. An entire sensor may be characterized based on the behavior of the individual "hot" sensor elements. Each sensor element in an array may be scaled based on the behavior of a few characteristic hot sensor elements to thereby provide dark current correction for each image. Thus, the dark current of a few hot sensor elements may be used to sense the chip temperature and predict the dark current of all sensor elements in a sensor array. Dark current prediction and compensation is applicable to camera systems with poor or no temperature control.

The various modules discussed herein may be, for example, circuits, hardware, software, commands, data files, programs, code, instructions, or the like, or various combinations thereof. Furthermore, at least some of the components of an embodiment of the invention may be implemented by using a programmed general-purpose digital computer, by using application specific integrated circuits, programmable logic devices, or field programmable gate arrays, or by using a network of interconnected components and circuits.

The processes, techniques, and methodologies described herein may be implemented in software using programming languages and tools such as Java, Pascal, C++, C, database languages, APIs, SDKs, assembly, firmware, microcode, and/or other languages and tools. Suitable signal formats may be embodied in analog or digital form, with or without error detection and/or correction bits, and/or other supporting data readily provided by those of skill in the pertinent art. The software may be stored in a memory such as static RAM, dynamic RAM, flash memory, ROM, CD-ROM, disk, tape, magnetic, optical, other computer storage medium, or transmitted signal. A processor used to execute the software may include a general purpose device such as a 80.times.86, Pentium (mark of Intel), 680.times.0, or other "off-the-shelf" microprocessor. The processor may include a special purpose processing device such as an ASIC, PAL, PLA, PLD, Field Programmable Gate Array, or other customized or programmable device.

Referring to FIG. 1, a block diagram illustrates a conceptual embodiment of a sensor device 100 that includes a sensor array 102. The sensor array 102 includes a plurality of interconnected sensor elements 104 that are each capable of generating a signal indicative of received light. The sensor elements 104 may be embodied in various ways and include one or more semiconductor components. A sensor element 104 may correspond to a pixel for purposes of rendering or capturing an image. Alternatively, multiple sensor elements 104 may correspond to a single pixel.

The sensor array 102 is in electrical communication with a readout module 106. The readout module 106 receives electrical signals from each sensor element 104 and provides and signal amplification and signal conversion. Typically, the readout module 106 converts received analog electrical signals into digital signals for digital signal processing. The readout module 106 may be in electrical communication with a clock 108 to synchronize electrical signal generation and data flow.

The readout module 106 is in electrical communication with an image analyzer module 110 to calculate and modify electrical signals in producing an image. The image analyzer module 110 provides image data in accordance with a control algorithm. The image analyzer module 110 sends the image data to a protocol module 112 that converts the image data into an established communication protocol. With conversion, the image data is readable by devices with the appropriate communication protocol. The image data is transmitted to an interface module 114 that converts the image data into electrical signals that may be rendered on a display or received by another device. The interface module 114 further receives user inputs to the sensor device 100 and converts the user inputs into electrical signals readable by the components.

The image analyzer module 110 is further in electrical communication with a control module 116. The image analyzer module 110 generates image control signals to the control module 116 to actively control the sensor elements and optimize signal generation. The control module 116 is further in communication with the interface module 114 to receive user inputs and control the sensor array 102 accordingly. Thus, light capture and image generation may be directly modified by user instruction.

Figure 2:
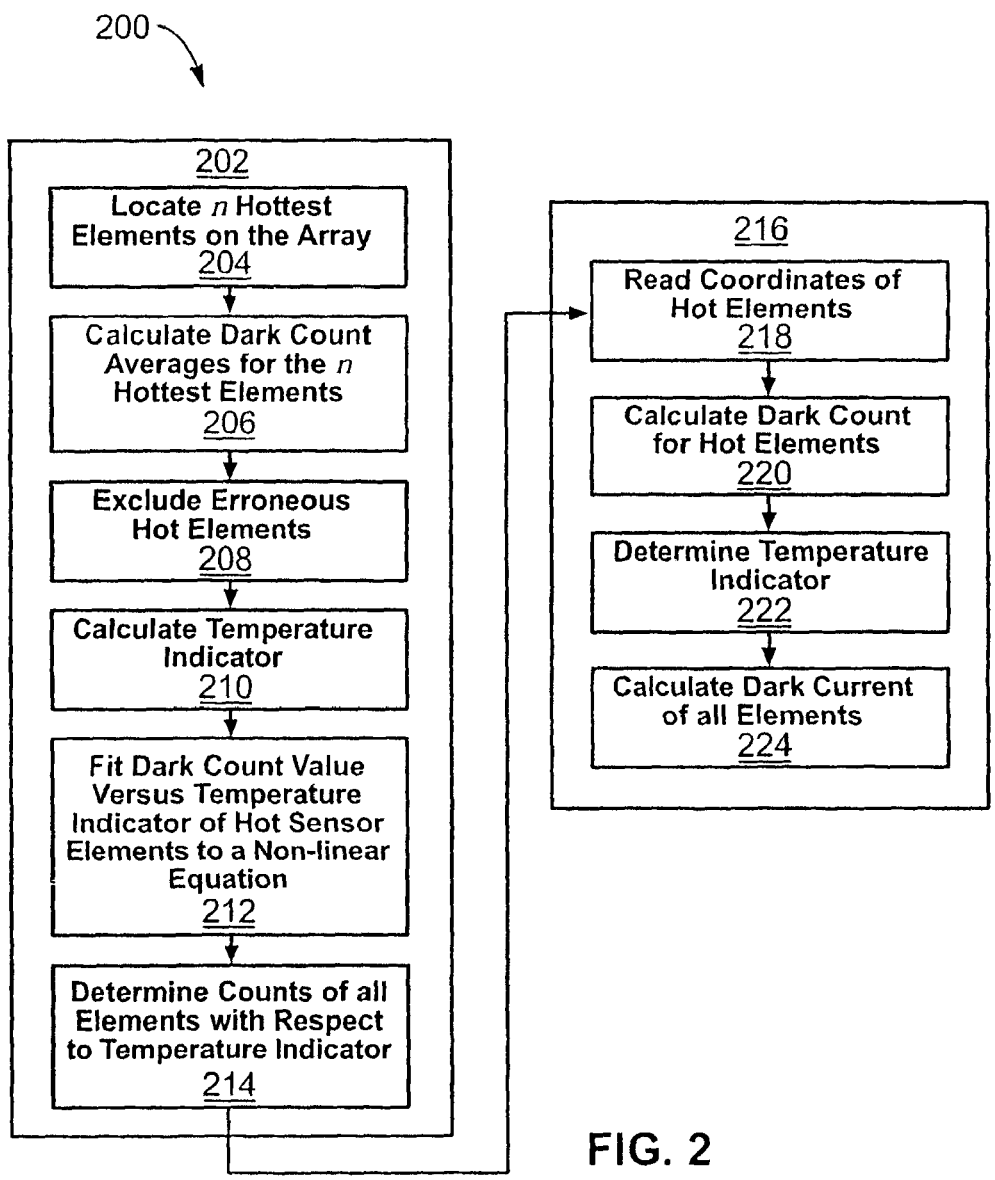
FIG. 2 is a flow diagram illustrating a dark current correction process.

Referring to FIG. 2, a flow diagram illustrates a process 200 in performing dark current correction. The process 200 may be an algorithm resident in a memory and performed by an image analyzer module 110, the control module 116, a combination thereof, or by another module, circuit or the like. The process 200 begins by implementing a calibration process 202 for a sensor device. Sensor elements of the sensor device are unique in behavior and are to be calibrated individually. The calibration process 202 locates 204 the n hottest light sensor elements in the array. This requires taking a large number of dark frame images within the temperature range expected during the actual operation of the sensor. After taking a set of dark frames, an image with a sufficiently large dark signal is used to measure and find n hottest light sensor elements.

A hot light sensor element is an element with a large dark signal value compared to its neighboring elements. The neighboring elements are significant because in an actual image containing light information, the adjacent elements are used to predict the light signal. Removing the light signal works accurately if there is a high degree of correlation between the light signal of the hot sensor element and its adjacent elements. In most images the correlation between adjacent elements is very high.

Locating 204 the hottest sensor elements may be accomplished by ranking the values of the elements based on their dark count. An estimate of the dark current may be obtained when a bias frame is first subtracted from the dark frame. However, if the bias is almost uniform across the chip, its value averages out in the computation. Generally, reference is made in the calculations of the dark count to the number of counts above the bias level. In locating a hot sensor element, the dark count of neighboring elements of the prospective hot sensor element are considered. If the neighboring sensor elements have dark counts approximating that of the prospective hot sensor element, then the prospective hot sensor element is not selected as a hot sensor element.

Next, averages for the dark counts for the n hottest elements are calculated 206 for frames at different temperatures but for the same exposure time. The averages are used as first temporary indicators for a sensor array temperature. The correlation between the individual dark count values and the temporary temperature indicator is calculated to evaluate the reliability of a sensor element representation of the actual sensor array temperature.

After calculating 206 average dark count values for the n hottest elements, the erroneous hot elements are excluded 208. This may be done by ordering the hot elements according to goodness of a fit to an equation representing the correlation between dark count values and temperature indicators. Sensor elements with a poor correlation are discarded. The average dark count of the remaining elements are used to calculate 210 a more refined temperature indicator.

The dark count values for each hot sensor element are fitted 212 again with a nonlinear equation to correlate the relationship of dark count versus temperature indicator $T_{ind}$. The nonlinear equation describes the relationship with reasonable accuracy. Other equations that accurately define the relationship between the dark count and the temperature indicator may be used as well. The nonlinear equation may include fitting parameters that vary with each sensor element based on performance. The coordinates of all hot elements as well as the fitting parameters are stored in a calibration file that contains all the information to evaluate the temperature of the sensor array. The temperature may not be given in terms of an actual temperature reading in Kelvin or Celsius but instead by the average count of the hot elements.

The calibration process 202 then determines 214 the counts of the remaining sensor elements with respect to $T_{ind}$ as the measure of the temperature. To accomplish this, the counts of each sensor element, for frames taken at different temperatures, is fitted with a nonlinear equation versus the temperature indicator. The nonlinear equation may have the same format as that for the hot-sensor elements. A fit to a nonlinear equation is performed for each sensor element. Coordinates for each sensor element and the corresponding fitting parameters are saved in a calibration file. Since the fit is later used to calculate the dark count, independently from the neighboring elements, the actual count of the sensor element (not the counts in respect to the neighboring elements) is used to determine the fitting parameters.

Figure 3:
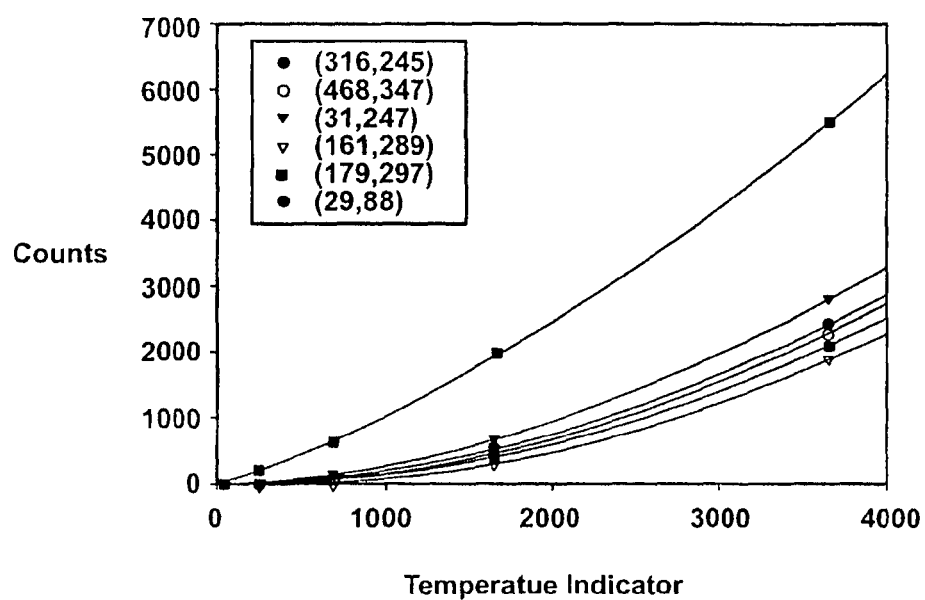
FIG. 3 is a graph illustrating dark counts versus temperature indicator for six sample sensor elements.

By way of example, FIG. 3 illustrates the data and fits for six different sensor elements. At completion of the calibration process 202, each element is fitted to a nonlinear equation with fitting parameters that are likely to be unique to that element. In this manner, each sensor element is calibrated to $T_{ind}$.

Any time after the calibration process 202, a dark current correction algorithm 216 may correct a taken image. The algorithm 216 begins with reading 218 the hot elements selected in the calibration process 202. The algorithm 216 then calculates 220 the dark count for the hot elements by comparing the dark count values of the hot elements with neighboring elements. During light exposure, neighboring elements will have similar light exposure. Light intensity generally has a smooth variation across a sensor array. The light count is typically approximate for a hot element and a neighboring element. Each hot element has an increased count value compared to its neighbors due to its increased dark count. The dark count value for a hot sensor element and its neighbors varies nonlinearly. Thus, the difference in count value between the hot sensor elements and its neighbors varies nonlinearly. The difference in count value is used to determine a dark count for each hot element.

The algorithm 216 then determines 222, based on the dark, count for the hot elements, a temperature indicator. The temperature indicator is determined by using the plotted nonlinear equation for each hot element. The temperature indicators for all the hot elements may be averaged to find a final temperature indicator. The algorithm 216 then determines 224 a dark current for each element by taking the final temperature indicator and calculating a dark count based on the corresponding nonlinear equation that was derived in the calibration process for each element. The dark count is used to derive a dark current that has a direct, and often linear, relationship with the dark count.

Any dark current correction is limited by the inherent noise of each dark frame. The noise of the dark frame consists of the readout noise and the dark current shot noise. The readout noise depends on parameters such as the readout speed and varies on the camera or sensor. The readout noise can be assumed as being independent of the exposure time or chip temperature. The dark current shot noise is described by Poisson statistics. The dark current shot noise increases with the square root of the dark current. The signal to noise ratio of the dark current increases with the square root of the dark current. Hence, for long exposure dark frames the uncertainty in the number of counts is large but so is the signal to noise ratio.

Figure 4:
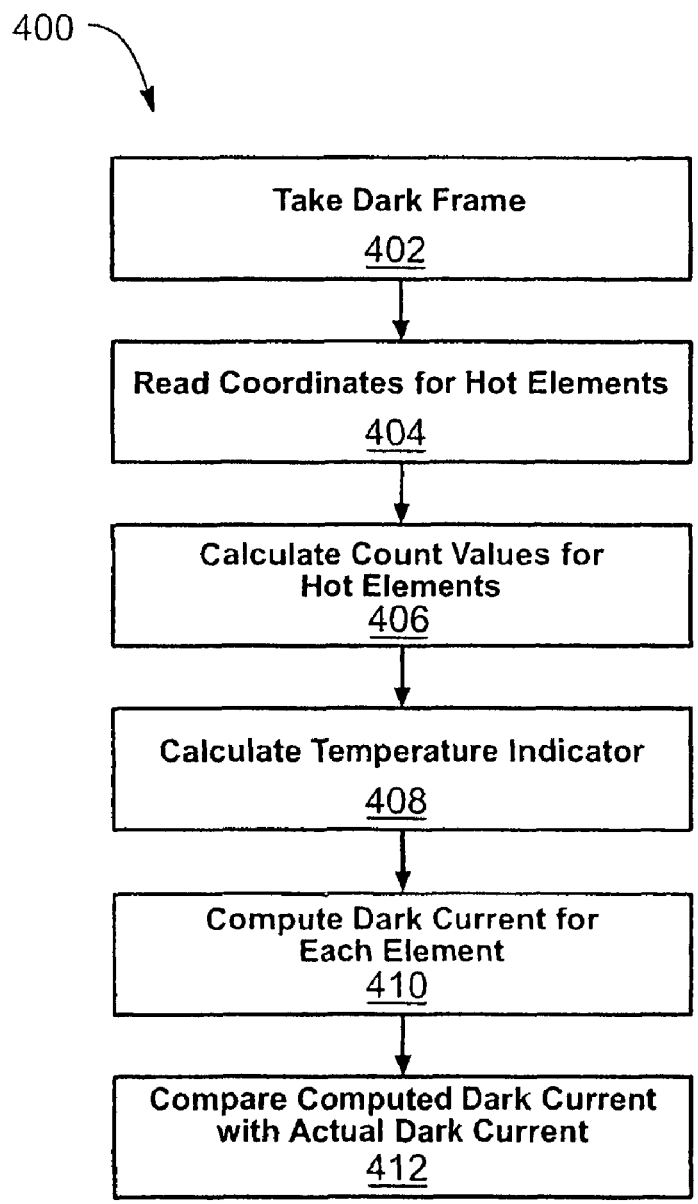
FIG. 4 is a flow diagram illustrating an evaluation process for the process of FIG. 2.

Referring to FIG. 4, an evaluation process 400 for the calibration process 202 is shown. The evaluation process 400 begins by taking 402 a dark frame, not used to find the calibration parameters, which is compared with a computed dark frame. The evaluation process 400 reads 404 the coordinates for the hot elements and calculates 406 count values for the dark frame. Each hot element's count should be characteristic to the same temperature. Factors like shot and read out noise will cause this value to be less than perfect. The evaluation process 400 calculates 408 the temperature indicator, $T_{ind}$, by using the fitting parameters from the hot elements file and solving the corresponding nonlinear equation. $T_{ind}$ is then used to compute 410 a dark count and dark current for each element. The computed dark current for the sensor is compared 412 to the actual dark current to determine performance.

Figure 5:
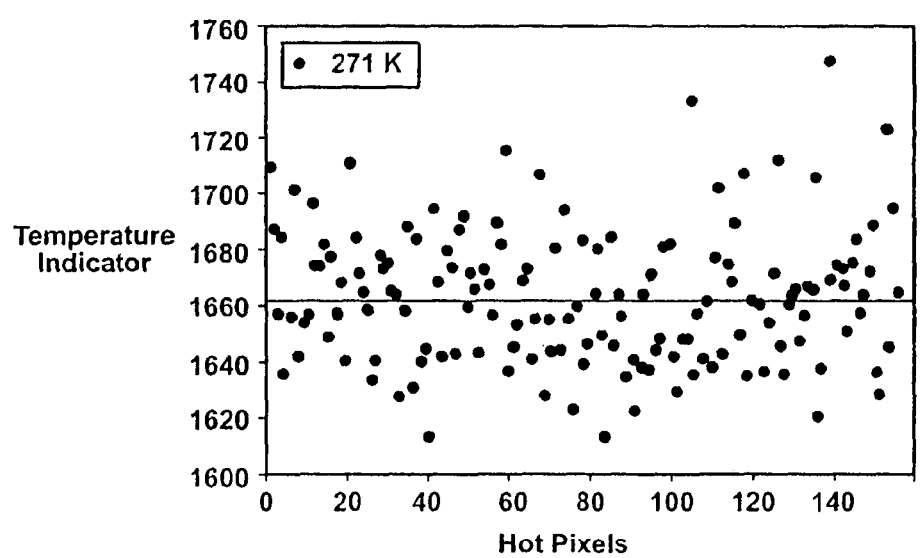
FIG. 5 is a graph illustrating temperature indicators versus selected sensor elements for a dark frame.
Figure 6A:
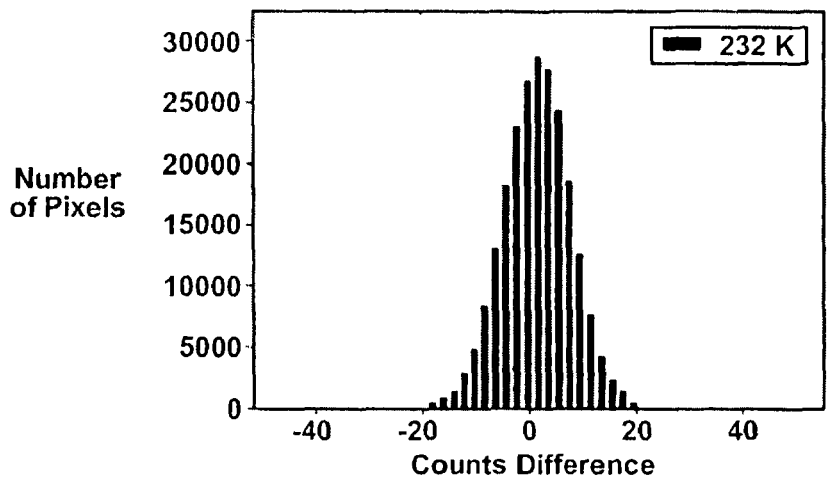
FIGS. 6A-6L are histograms illustrating count differences between dark frames.
Figure 6B:
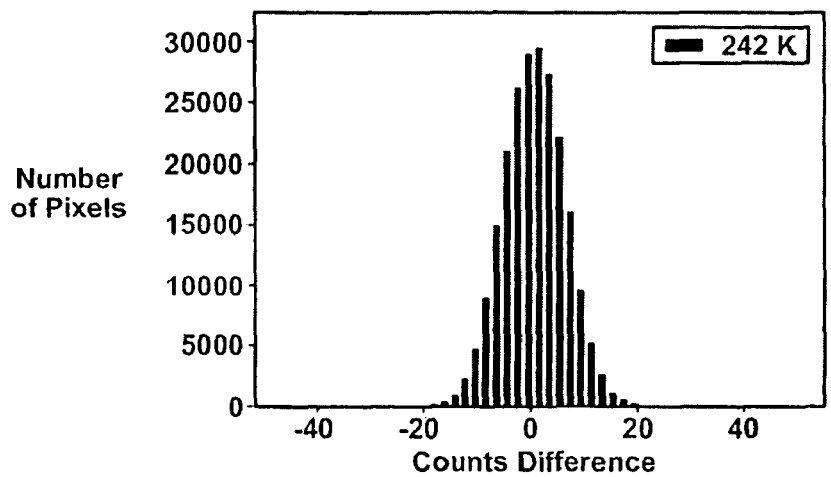
Figure 6C:
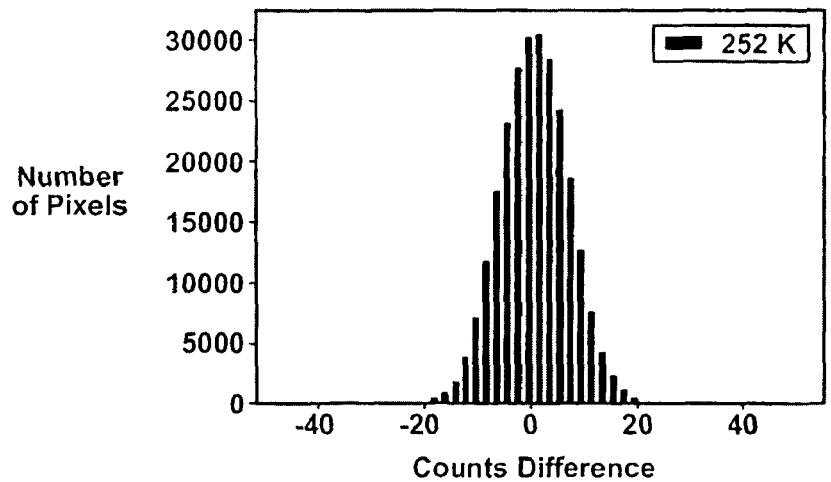
Figure 6D:
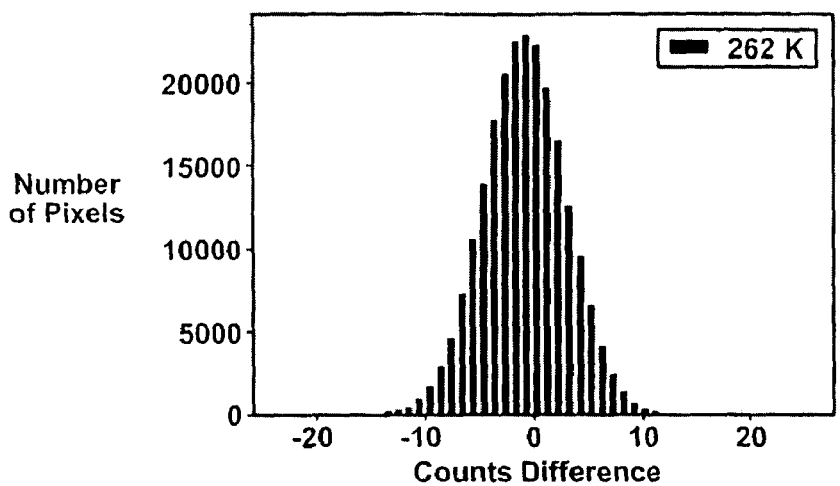
Figure 6E:
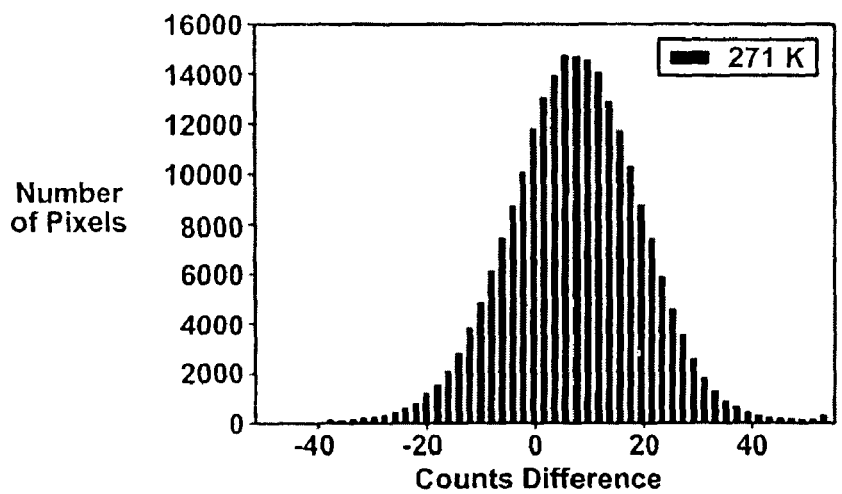
Figure 6F:
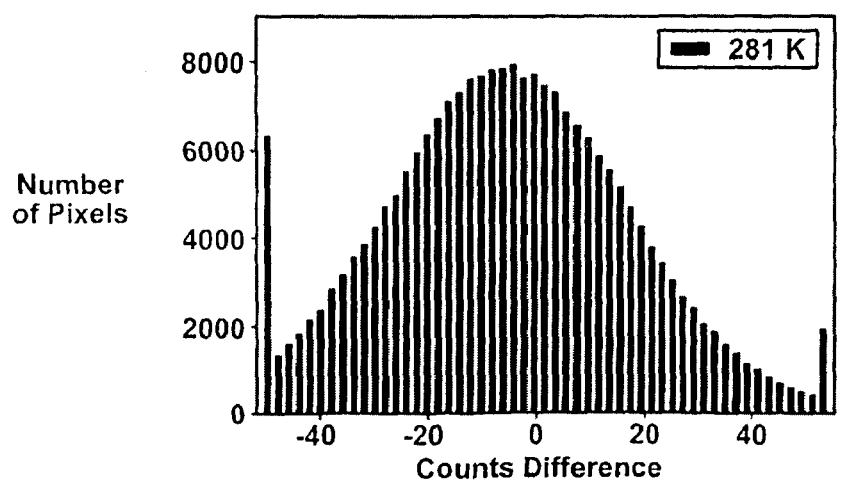
Figure 6G:
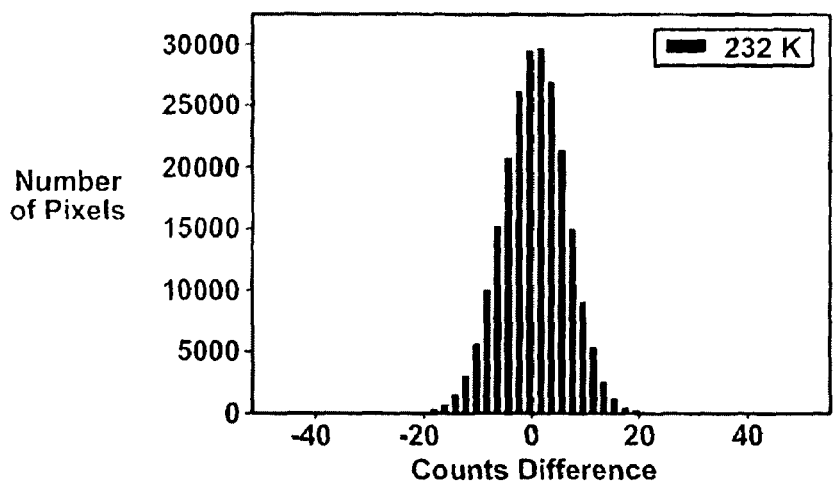
Figure 6H:
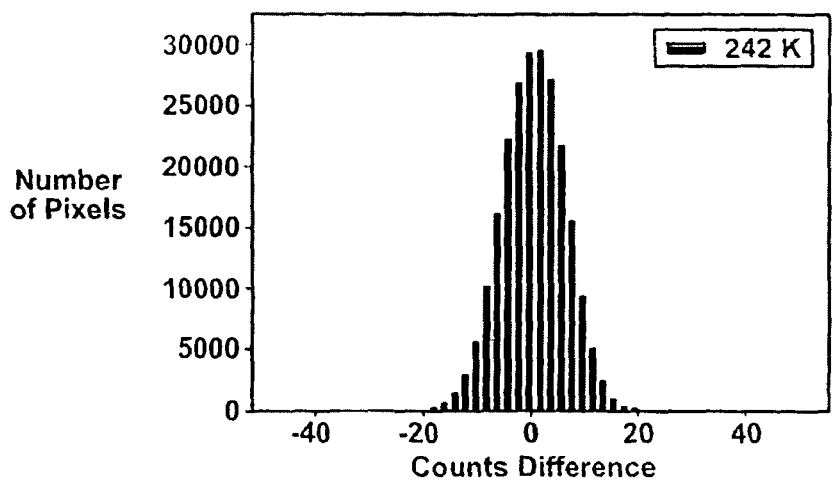
Figure 6I:
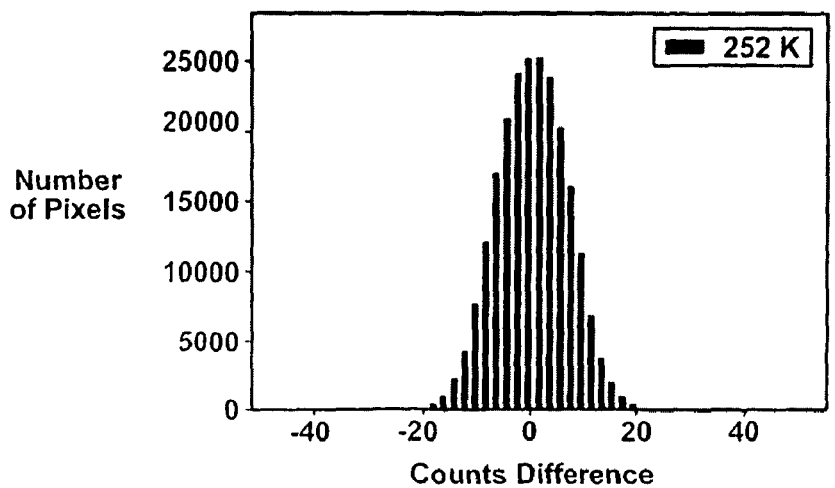
Figure 6J:
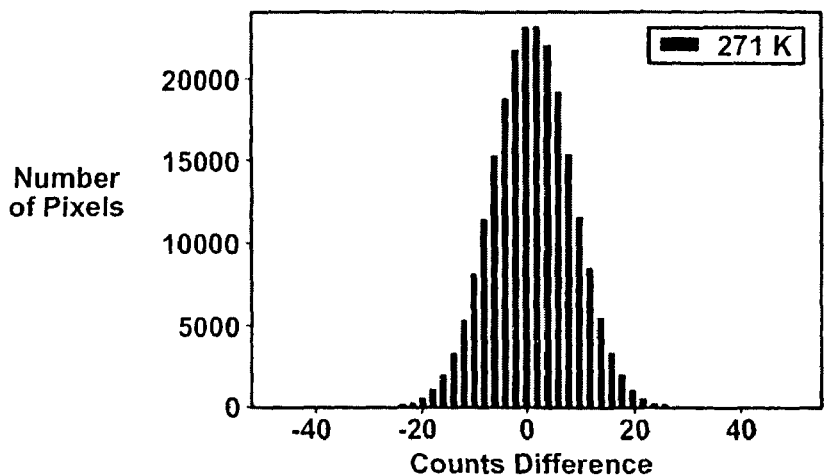
Figure 6K:
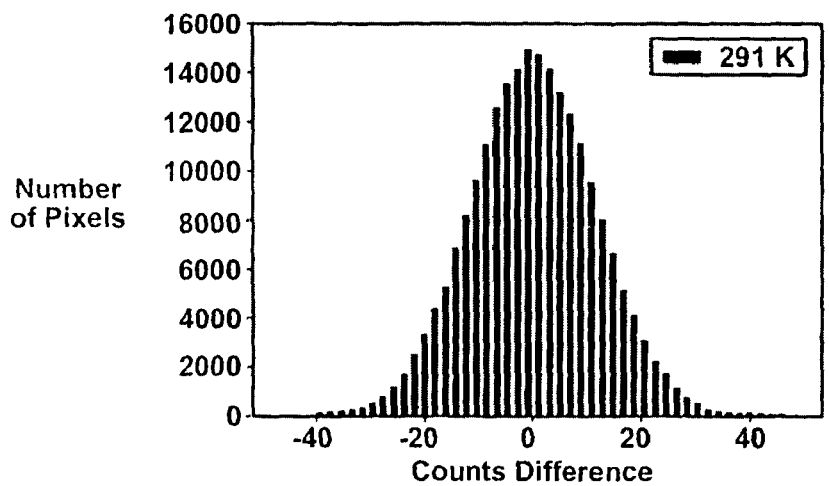
Figure 6L:
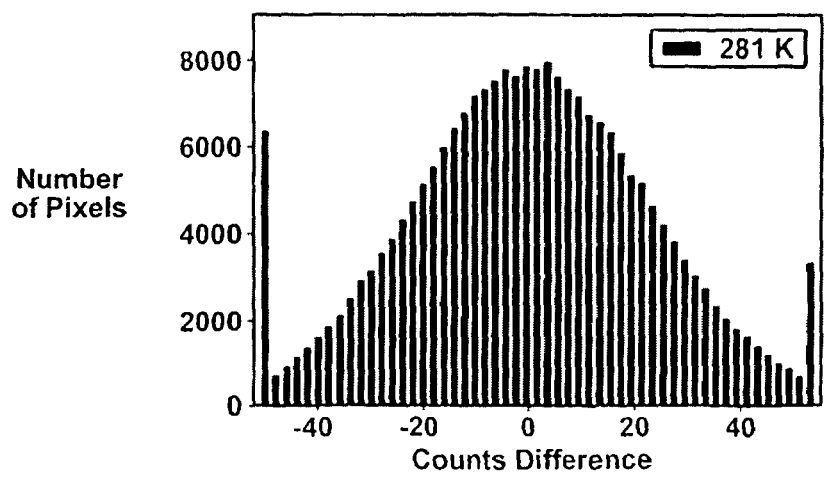

By way of example, FIG. 5 illustrates the temperature indicated by each of 150 hot elements for a frame, which according to the temperature reading on the camera, was taken at 271 K. As expected the temperature indicated is similar for all elements. Random noise causes a spread from element to element. Instead of using the average of the individual elements as the temperature indicator the sturdier median value is chosen as $T_{ind}$. Choosing the median over the mean might not be significant for this dark frame. For a frame that also contains light information the difference between mean and median can be significant. The median value of the individual temperature indicators can then be used, in conjunction with the calibration files, to calculate the dark counts for each light sensor element in the array.

Referring to FIGS. 6A-6F, histograms are shown that illustrate the difference between actual dark frames and computed dark frames. Referring to FIGS. 6G-6L, histograms are shown that illustrate the differences between the actual dark frames and master dark frames. In order to evaluate the performance of the image correction, the algorithm is compared to master dark frames computed from dark frames at each temperature. In an ideal case the histogram has a narrow distribution with the peak value at zero counts difference. The width of the distributions of the master frames and the calculated frame is almost identical.

The median values for the counts difference for the master frame are given by: 0 counts at 232 K, −0.08 counts at 242 K, −0.18 counts at 252 K, 0.08 counts at 262 K, −0.14 counts at 271 K, −0.54 counts at 281 K. All peak values are very close to zero, an indication that the temperatures of the dark frames was really the same temperature as the master frames. The median value for the computed frames are given by: 0.99 counts at 232 K, 0.16 counts at 242 K, −1.79 counts at 252 K, 3.32 counts at 262 K, 6.86 counts at 271 K, −6.15 counts at 281 K. The peak of the distribution is slightly moved from the zero point, especially at the higher temperature. The origin of this small difference is either due to random noise which leads to an incorrect determination of the temperature, or a systematic error due to small differences between the fits and the actual data. Overall, the dark current correction algorithm performs similarly as the actual master frames. The deviations between computed and real dark image decreases further if the calibration temperature range is smaller.

The real test for the dark current correction algorithm comes when an image contains signals from thermally generated electrons as well as from photon excited electrons. Analyzing an image with known dark count determines whether an image correction operates accurately. Adding a dark frame to a real image can generate such an image. The light signal adds to the dark current and will cause some of the temperature indicator to predict a false temperature. However, only if the light intensity changes significantly from the hot element to its adjacent elements will such an erroneous reading occur. The effect the light has on the indicators depends on the light distribution and intensity of the image.

In the following examples, data was collected for a SITe chip to illustrate the performance of a dark current correcting algorithm. A Pixelvision camera that houses the SITe chip is well behaved and, after the temperature is stabilized for a sufficient time, very stable. The SITe chip was calibrated with the first 50 seconds pictures taken at temperature between 232 K and 281 K. The lowest temperature of 222 K was not used because of the very low dark signal in a 50 second exposure. The 291 K was not included because of the very high dark current level. Applications which require a calibration over 50 K are very rare. The large range of dark current provide sufficient indication of the performance of the dark current correction algorithm.

Figure 7:
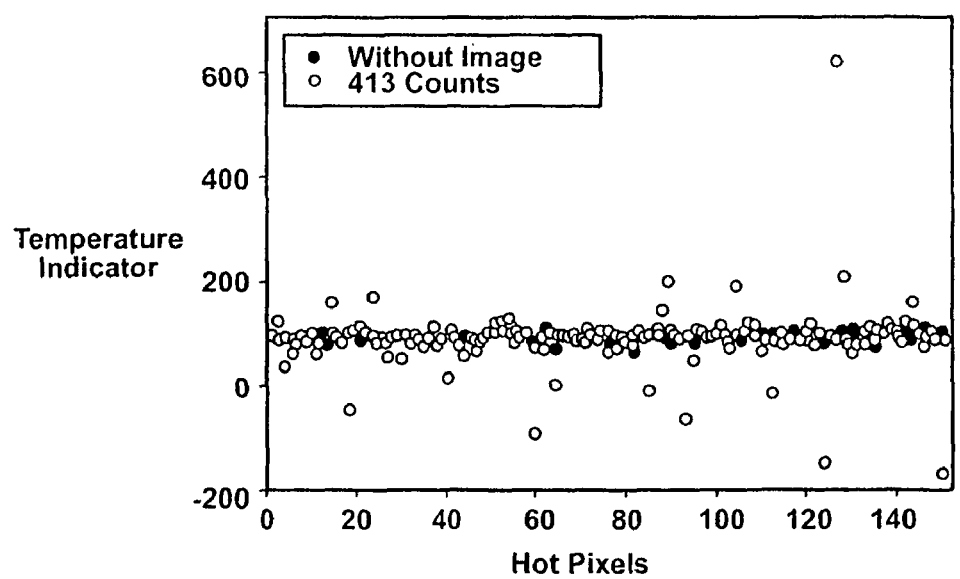
FIG. 7 is a graph illustrating temperature indicators for an image.

FIG. 7, a graph illustrates the effect that a superimposed image has on individual temperature elements. The black circles depict the indicators for one dark frame taken at 242 K. The median value of all temperature indicators for the dark frame is given as 103.01. FIG. 7 also illustrates white circles that depict indicators for the dark frame plus an image normalized to 413 counts. The image was taken with a short exposure time with a Canon Powershot S45. Some indicators have a count that does not correspond to the temperature of the image. One indicator's value is approximately six times the value without the superimposed image. The temperature indicated by this indicator is off by about 20 K. Several indicators even show physically impossible negative temperatures. However, the median values for all indicators are only changed slightly from 103.01 without image to 102.68 with image. Hence, even with the superimposed image the dark current correction algorithm is able to find the correct temperature.

Figure 8A:
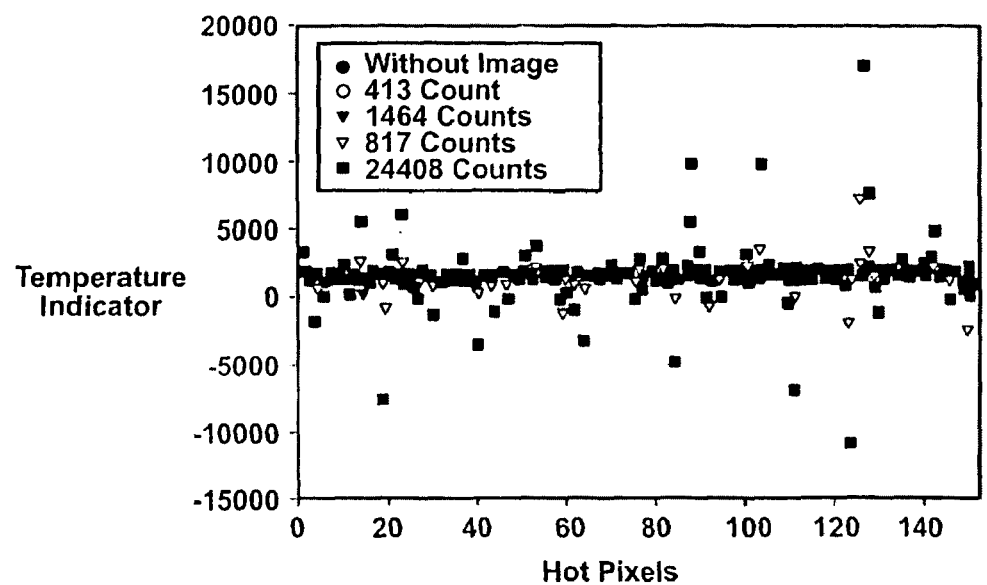
FIGS. 8A-8B are graphs illustrating temperature indicators for images.
Figure 8B:
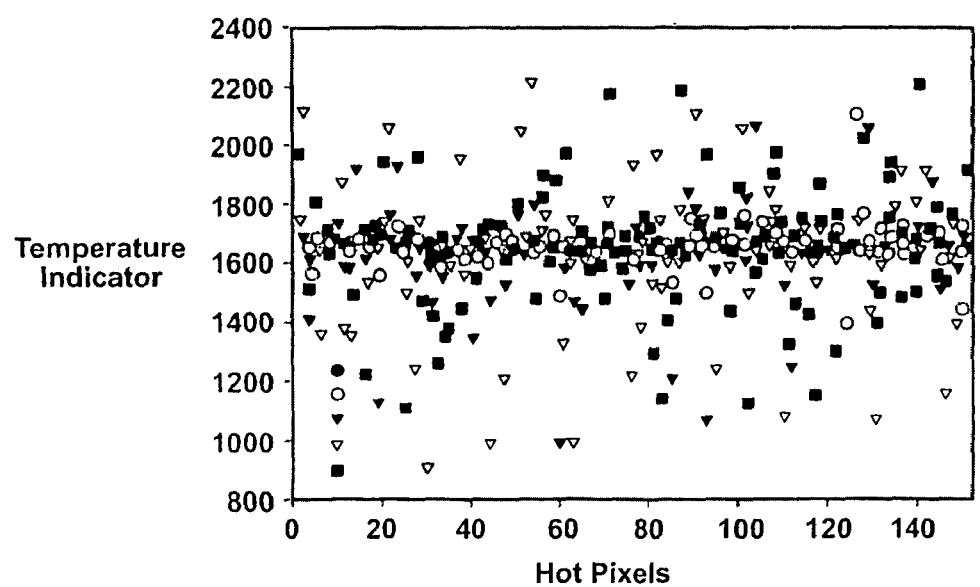

Referring to FIGS. 8A and 8B, the temperature indicators for a dark frame with a $T_{ind}$=1661.45 (corresponding to an array temperature of 271 K) is added to an image scaled to four different light levels. FIG. 8A illustrates all indicators while FIG. 8B is an enlargement of the FIG. 8A. The spread of the individual indicators increases with increasing count level of the image. The effect the light exposure has on some indicators is amplified with increasing signal of the image. However, while the average value of all indicators would be thrown off by such elements the median value stayed fairly stable. The individual values for $T_{ind}$ are given by: 1657.93 at 413 counts, 1658.57 at 1654 counts, 1658.78 at 6617 counts, and 1666.45 at 26468 counts.

In astronomical imaging the light level is generally very low and long exposure times are required to receive an acceptable signal to noise ratio. On the other hand, the contrast between the dark sky background and a very bright object is often very large. Hence, the majority of the elements have a fairly small number of counts. The problem with dark current is severe if one is not interested in the bright object, but in an object that is only slightly higher than the sky background. Hence, even for a high contrast image, dark current can be a nuisance.

In Table 1, the median value of temperature indicators without an image is shown. Table 1 indicates that the indicated temperature, $T_{ind}$, for a given dark frame, changes only slightly with the superimposed images.

TABLE 1

| Temperature | $T_{ind}$ without image | $T_{ind}$ with image |
| --- | --- | --- |
| 232 K | 37.14 | 37.24 |
| 242 K | 103.01 | 101.57 |
| 252 K | 288.33 | 286.8 |
| 262 K | 715.03 | 713.62 |
| 271 K | 1661.45 | 1661.74 |

Dark frames are scaled by multiplying the dark current of a master dark frame with the time ratio of the master dark frame and the image that needs to be corrected. For example, if the master dark frame was obtained at 50 second exposure time and the image was taken with 10 seconds exposure time, the counts of the master frame are divided by 5. The procedure of time scaling only leads to the desired result if the dark count is a linear function of the exposure time.

The time scaling of the dark current image correction algorithm involves calculating excess dark count for the dark frame. This value is then multiplied by the ratio of the exposure times of the calibration and the dark frame. For example, if the calibrations routine was performed with 50 second frames and the dark frame is a 20 second frame, the dark count would be multiplied by ⅖. Now, the median value of temperature indicators indicates the right temperature. The values of each single element are now calculated from the fitting coefficients. To adjust for the different exposure time, the values are multiplied by the inverse of the previous time ratio. For the example above, the multiplication factor would be 5/2.

Figure 9B:
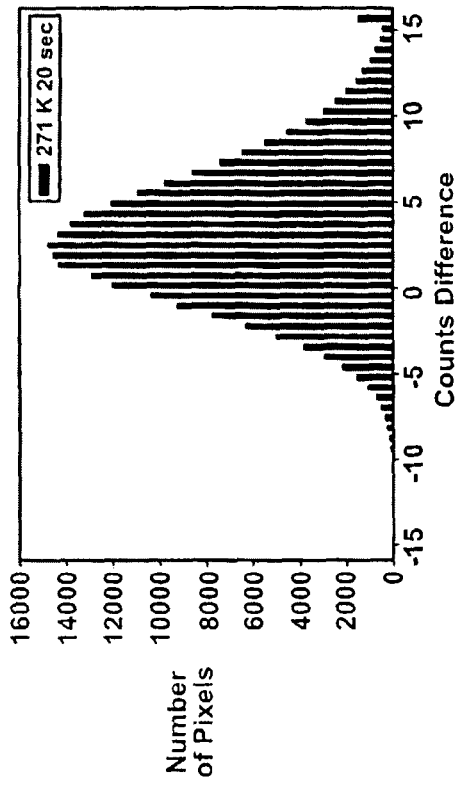
FIGS. 9A-9D are histograms illustrating count differences between dark frames.
Figure 9D:
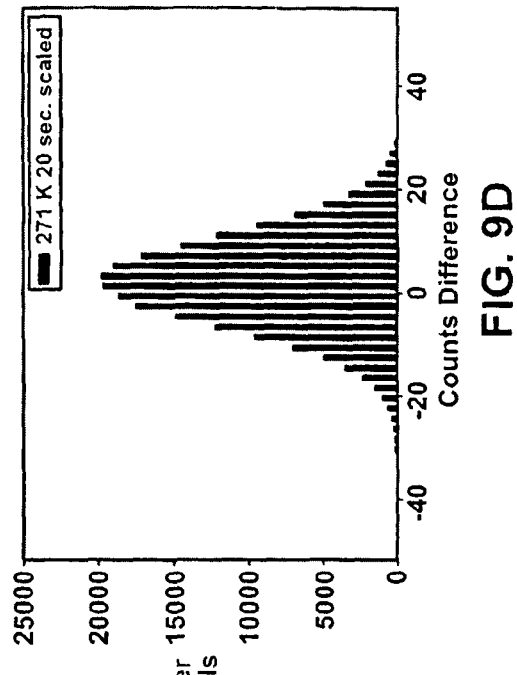
Figure 9A:
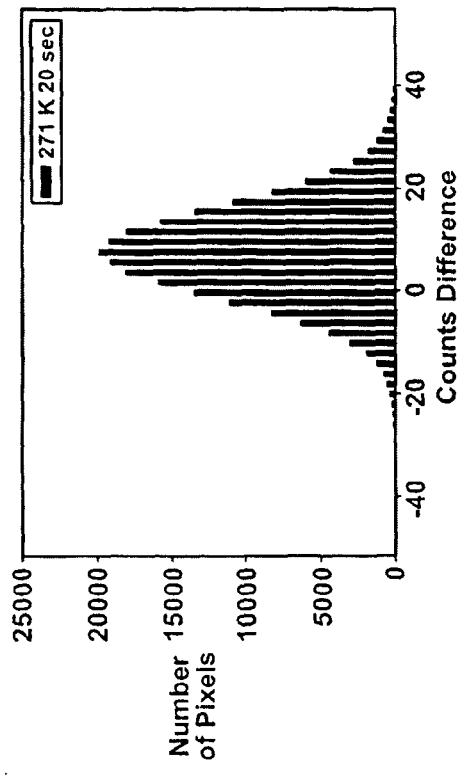

FIGS. 9A-D illustrate the distributions for a frame scaled up from the 50 second calibration to a 100 second dark frame. The distributions for the computed, the scaled, and the unscaled master frame (calculated from 50 dark frames at 100 seconds.) are shown in FIGS. 9A, 9B, and 9D respectively. The peak for the computed frame is located at 1.26 counts, very close to the ideal 0 counts mark. In fact, the distribution is better centered than the original distribution for the 50 seconds frame in FIG. 5, indicting that the small inaccuracies of the fit and the time scale were offsetting each other.

Figure 9C:
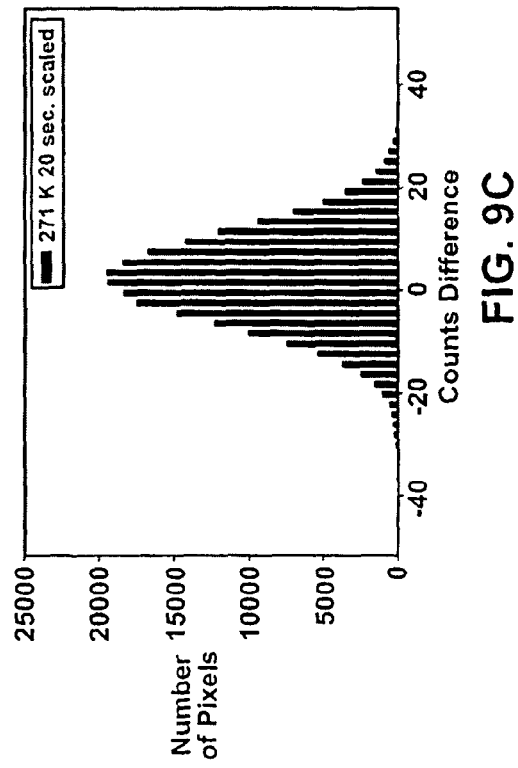

In FIG. 9B, the peak for the percentage difference distribution is given by 0.11 percent. One interesting difference from the 20 seconds dark frame scaling to the 100 seconds scaling is that the widths for the scaled distributions in FIGS. 9A and 9C is larger than the width for the real master frame 9D. The number of outliers to the left and right of the distributions is much smaller for the 100 second master frame. The signal to noise ratio for a short exposure time dark frame is smaller. The larger noise is then propagated to the scaled dark frame. This is true even if the time scaling worked perfectly. The small effect of nonlinearities in the time scaling is seen best in FIG. 9C.

FIGS. 10A-D, illustrate distributions for a frame scaled up from the 50 seconds calibration to a 100 seconds dark frame. The distributions for the computed, the scaled and the unscaled master frame (calculated from 50 dark frames at 100 seconds.) are shown in FIGS. 10A, C, and D. The peak for the computed frame is located at 1.26 counts which is very close to the ideal 0 counts mark. The peak for the percentage difference distribution in FIG. 10B is given by 0.11 percent. An interesting difference from the 20 seconds dark frame scaling to the 100 seconds scaling is that the widths for the scaled distributions 10A and 10C is larger than the width for the real master frame in FIG. 10D.

The number of outliers to the left and right of the distributions is much smaller for the 100 second master frame. This should not come as a surprise, considering the fact that the scaled distributions are based on a 50 second calibration. The signal to noise ratio for a short exposure time dark frame is smaller. The larger noise is then propagated to the scaled dark frame. This is true even if the time scaling worked perfectly.

Figure 11A:
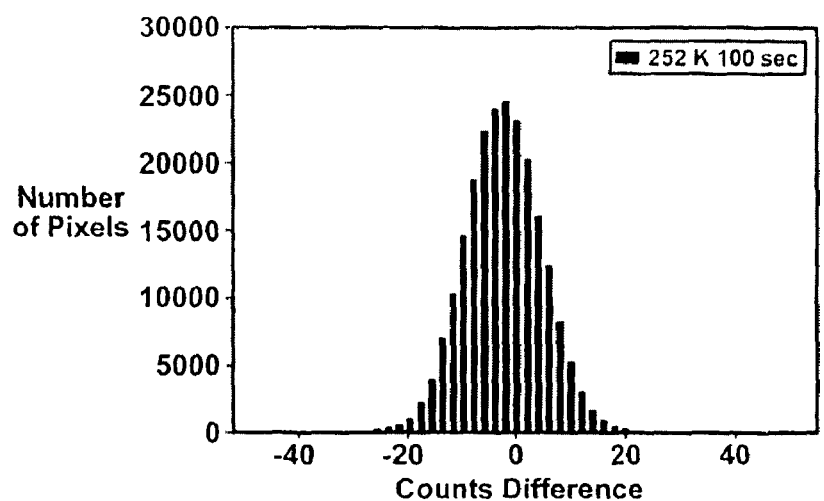
FIGS. 11A-11F are histograms illustrating count differences between dark frames.
Figure 11B:
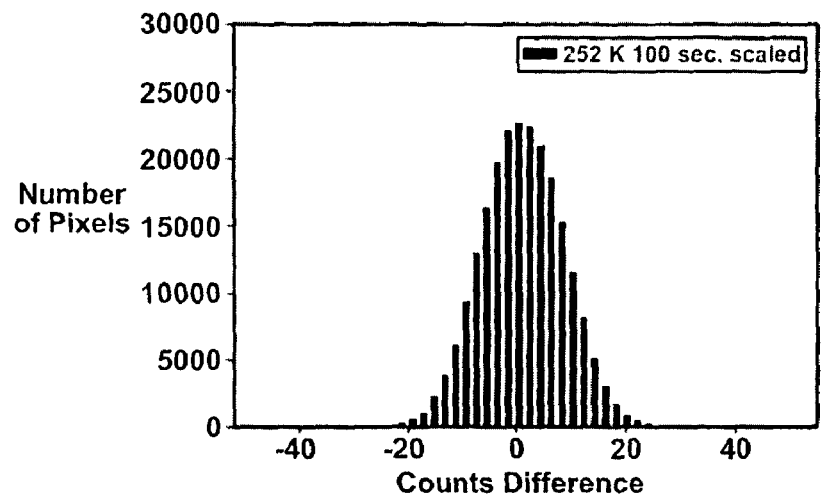
Figure 11C:
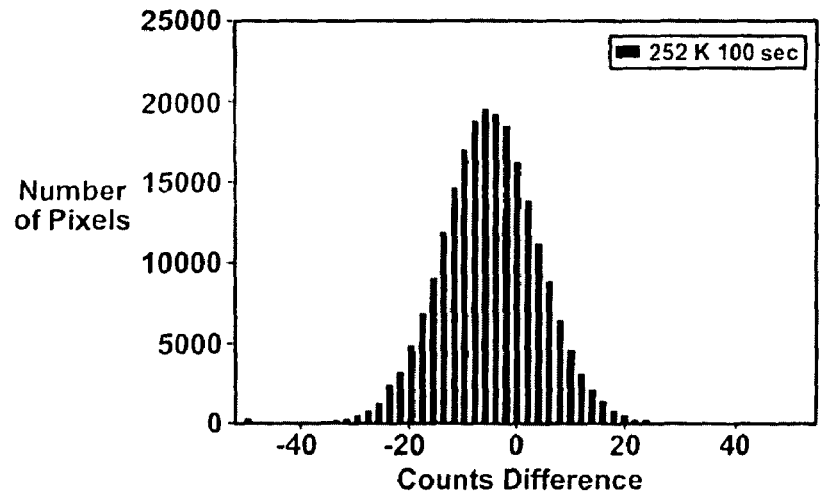
Figure 11D:
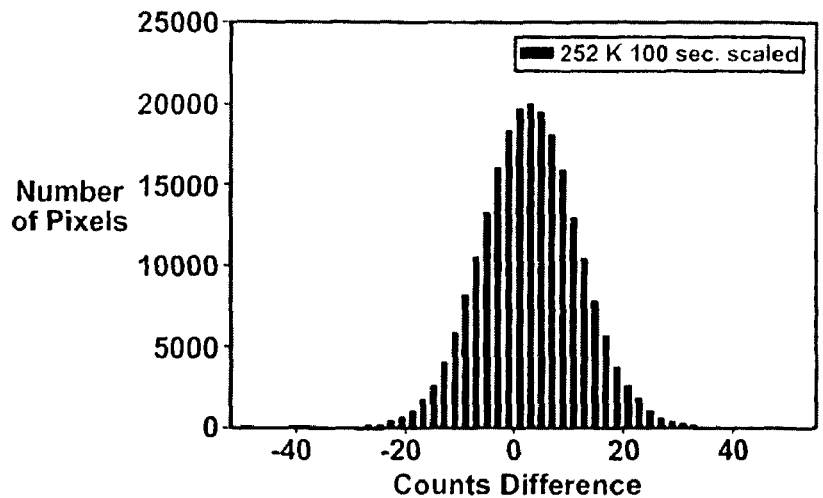
Figure 11E:
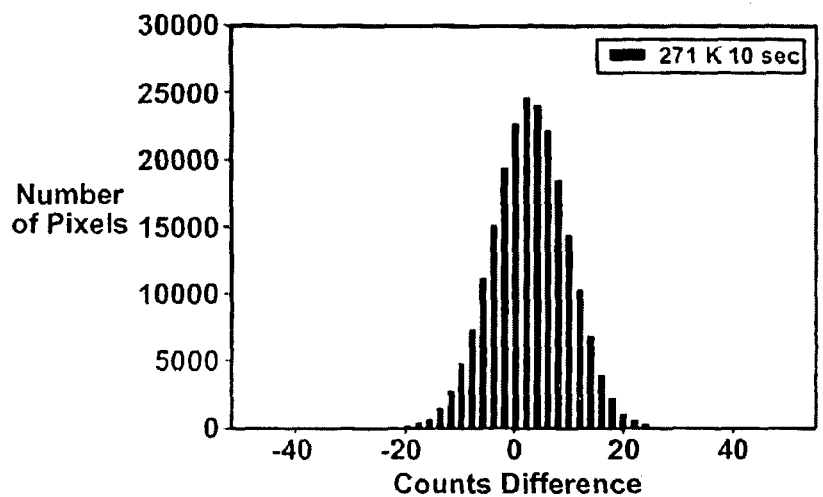
Figure 11F:
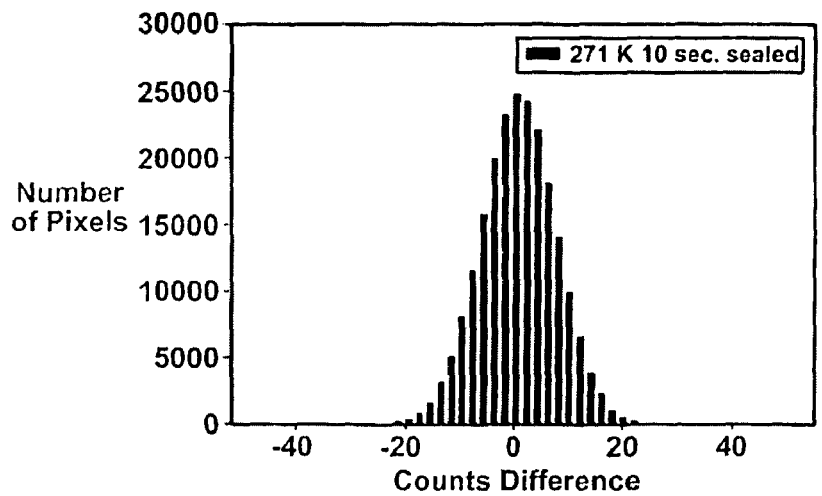

FIGS. 11A-F illustrate additional examples of scaled dark images. FIGS. 11A, C, and E illustrate the differences between computed dark frames and actual dark frames. FIGS. 11B, D, and F illustrate the differences between scaled master frames and actual dark frames. The width of the distributions is very similar for both methods. The peak of the computed distributions is slight shifted from the zero point. The median value at 252 K, and 100 sec is given by −3.56 counts, at 262

K, and 100 sec by −6.17 counts, and at 271 K and 10 seconds at 1.77 counts. These deviations are all in the range of the uncertainty of the original unscaled computation. Hence, the algorithm can be used to time scale dark frames.

Figure 12A:
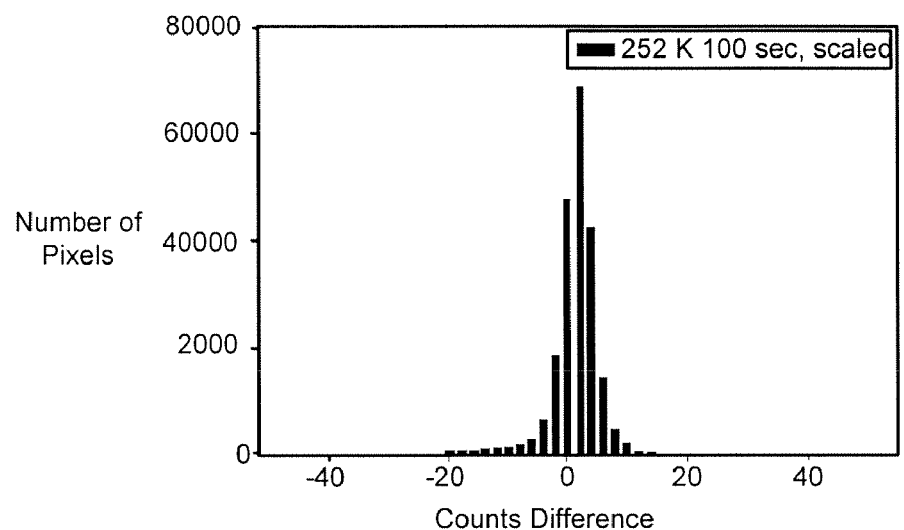
FIG. 12A-12B are histograms illustrating count differences between dark frames.

FIG. 12A shows the difference between a master dark frame at 257 K and 75 second exposure time and the computed frame. The master frame was derived as the average of twenty 75 second exposures. Its average dark count was given by approximately 100 counts. The computed frame was calibrated with 50 dark frames each at 242 K, 252 K, 262 K and 271 K, giving a calibration range of 29 K. The exposure time for the calibration dark frames was 100 seconds and 150 hot elements were utilized as temperature indicators. The temperature indicators were chosen based on the 100 seconds exposure only. The median value for the distribution 12A was given by −1.2 counts. Hence, the temperature was determined correctly.

Figure 12B:
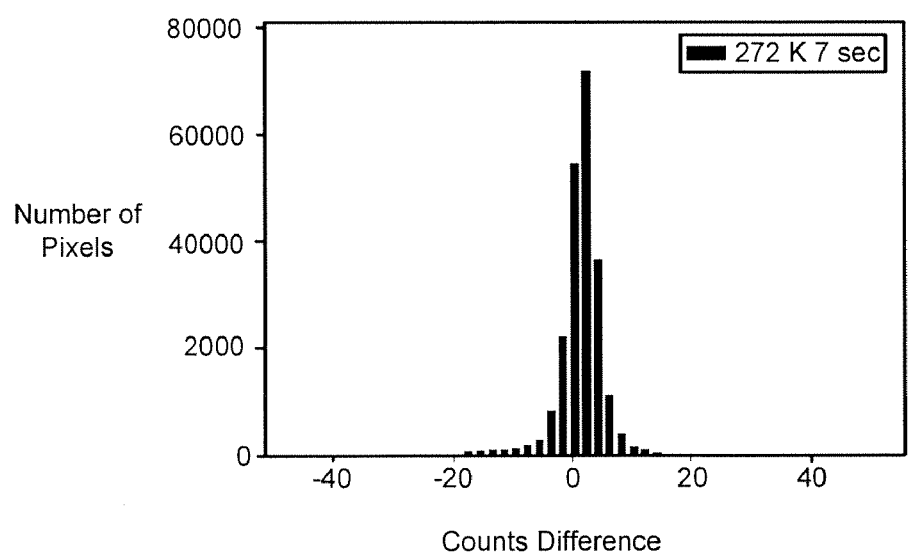

The width of the distribution is narrower than some of the previous distributions. This is due to the fact that this time the computed frame is compared to a master frame. The master frame contains less noise than the individual dark frames investigated previously. The correction of an individual dark frame will always suffer from the uncertainty associated with readout and shot noise. FIG. 12B shows the difference between a master dark frame at 277 K and 7 seconds exposure time and the computed image. The calibration protocol for the computation used 20 seconds exposures at 262 K, 271 K, 281 K and 291 K. Again 150 hot sensor elements were chosen based on the 20 seconds exposures only. The correction protocol scales the dark frame down by factor of approximately one-third. The computed frames is then compared to the master frame obtained from fifty 7 seconds exposures. The distribution in FIG. 12B is almost centered (median value=−1.5 counts) and quite narrow. The average dark count for the frame was given by approximately 190 counts.

Hot elements can be utilized as temperature indicators to correct for dark current over a wide temperature range. The superposition of a real light image does not change the indicated temperature significantly. Dark current calibrated for one exposure time can in principle be scaled to different exposure time dark frames. Time scaling has its limitation as the dark current reaches the range where it becomes nonlinear. Using different hot elements as temperature indicators can improve the results for time scaled images in the nonlinear range.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These and other modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. A method for correcting for dark current in a sensor having an array of sensor elements, comprising:
reading coordinates for predetermined hot sensor elements in the array;
calculating the dark count for the hot sensor elements;
determining a temperature indicator based on the dark count for the hot sensor elements; and
calculating the dark count for all sensor elements based on the temperature indicator.

2. The method of claim 1, wherein calculating the dark count for the hot sensor elements includes comparing the hot sensor elements to neighboring sensor elements during light exposure.

3. The method of claim 1, wherein determining a temperature indicator includes fitting the dark count for each hot sensor element to a nonlinear equation.

4. The method of claim 1, wherein calculating the dark count for all sensor elements includes applying the temperature indicator to a nonlinear equation.

5. A sensor for capturing images in response to light exposure and correcting for dark current, the sensor comprising:
an array including a plurality of sensor elements; and
a machine-readable medium having instructions stored thereon to perform the method of,
reading coordinates for predetermined hot sensor elements in the array,
calculating the dark count for the hot sensor elements,
determining a temperature indicator based on the dark count for the hot sensor elements, and
calculating the dark count for all sensor elements based on the temperature indicator.

6. The sensor of claim 5, wherein calculating the dark count for the hot sensor elements includes comparing the hot sensor elements to neighboring sensor elements during light exposure.

7. The sensor of claim 5, wherein determining a temperature indicator includes fitting the dark count for each hot sensor element to a nonlinear equation.

8. The sensor of claim 5, wherein calculating the dark count for all sensor elements includes applying the temperature indicator to a nonlinear equation.

9. A non-transitory computer readable medium having stored thereon computer readable code for correcting for dark current in a sensor having an array of sensor elements, the method comprising:
reading coordinates for predetermined hot sensor elements in the array;
calculating the dark count for the hot sensor elements;
determining a temperature indicator based on the dark count for the hot sensor elements; and
calculating the dark count for all sensor elements based on the temperature indicator.

10. The computer readable medium of claim 9, wherein calculating the dark count for the hot sensor elements includes comparing the hot sensor elements to neighboring sensor elements during light exposure.

11. The computer readable medium of claim 9, wherein determining a temperature indicator includes fitting the dark count for each hot sensor element to a nonlinear equation.

12. The computer readable medium of claim 9, wherein calculating the dark count for all sensor elements includes applying the temperature indicator to a nonlinear equation.

13. A method for correcting for dark current in a sensor having an array of sensor elements, comprising:
calibrating each sensor element by performing the method of,
locating a plurality of hot sensor elements experiencing high dark counts,
calculating average dark count values for the hot sensor elements;
calculating a temperature indicator based on the average dark count values, deriving a nonlinear equation fitting the dark count values to the temperature indicator for the hot sensor elements, calculating the dark count values for each remaining sensor element for a temperature indicator, and deriving a nonlinear equation fitting the dark count values to the temperature indicator for each remaining sensor element;

reading coordinates for predetermined hot sensor elements in the array;

calculating the dark count for the hot sensor elements;

determining a temperature indicator based on the dark count for the hot sensor elements; and calculating the dark count for all sensor elements based on the temperature indicator.

14. The method of claim 13 wherein calibrating each sensor element further comprises excluding from calculation erroneous dark count values for hot sensor elements.

15. The method of claim of claim 13 wherein deriving a nonlinear equation for the each sensor element includes determining fitting parameters of the nonlinear equation.

16. The method of claim 13, wherein calculating the dark count for the hot sensor elements includes comparing the hot sensor elements to neighboring sensor elements during light exposure.

17. The method of claim 13, further comprising evaluating the calibrating of each sensor element by performing the method of, taking a dark frame image, reading the coordinates for each hot sensor element, calculating dark count values for each hot sensor element, calculating a temperature indicator based on the dark count values, calculating dark count values for each sensor element, and comparing calculated dark count values with actual dark current values from the dark frame image.

18. A sensor for capturing images in response to light exposure and correcting for dark current, the sensor comprising:

an array including a plurality of sensor elements; and a machine-readable medium having instructions stored thereon to perform the method of, calibrating each sensor element by performing the method of, locating a plurality of hot sensor elements experiencing high dark counts, calculating average dark count values for the hot sensor elements;

calculating a temperature indicator based on the average dark count values, deriving a nonlinear equation fitting the dark count values to the temperature indicator for the hot sensor elements, calculating the dark count values for each remaining sensor element for a temperature indicator, and deriving a nonlinear equation fitting the dark count values to the temperature indicator for each remaining sensor element;

reading coordinates for predetermined hot sensor elements in the array;

calculating the dark count for the hot sensor elements;

determining a temperature indicator based on the dark count for the hot sensor elements; and calculating the dark count for all sensor elements based on the temperature indicator.

19. The sensor of claim 18, wherein calibrating each sensor element further comprises excluding from calculation erroneous dark count values for hot sensor elements.

20. The sensor of claim 18, wherein calculating the dark count for the hot sensor elements includes comparing the hot sensor elements to neighboring sensor elements during light exposure.

21. The sensor of claim 18, further comprising evaluating the calibrating of each sensor element by performing the method of, reading the coordinates for each hot sensor element, calculating dark count values for a dark frame image for each hot sensor element, calculating a temperature indicator based on the dark count values, calculating dark count values for a dark frame image for each sensor element, and comparing calculated dark count values with actual dark current values from the dark frame image.

22. A sensor for capturing images in response to light exposure and correcting for dark current, the sensor comprising:

an array including a plurality of sensor elements; and a machine-readable medium having instructions stored thereon to perform the method of, calibrating each sensor element by performing the method of, locating a plurality of hot sensor elements experiencing high dark counts, calculating average dark count values for the hot sensor elements;

calculating a temperature indicator based on the average dark count values, deriving a nonlinear equation fitting the dark count values to the temperature indicator for the hot sensor elements, calculating the dark count values for each remaining sensor element for a temperature indicator, and deriving a nonlinear equation fitting the dark count values to the temperature indicator for each remaining sensor element;

reading coordinates for predetermined hot sensor elements in the array;

calculating the dark count for the hot sensor elements;

determining a temperature indicator based on the dark count for the hot sensor elements; and calculating the dark count for all sensor elements based on the temperature indicator.

23. The sensor of claim 22, wherein calibrating each sensor element further comprises excluding from calculation erroneous dark count values for hot sensor elements.

24. The sensor of claim 22, wherein calculating the dark count for the hot sensor elements includes comparing the hot sensor elements to neighboring sensor elements during light exposure.

25. The sensor of claim 22, further comprising evaluating the calibrating of each sensor element by performing the method of, reading the coordinates for each hot sensor element, calculating dark count values for a dark frame image for each hot sensor element, calculating a temperature indicator based on the dark count values, calculating dark count values for a dark frame image for each sensor element, and comparing calculated dark count values with actual dark current values from the dark frame image.

26. A non-transitory computer readable medium having stored thereon computer readable code for correcting for dark current in a sensor having an array of sensor elements, the method comprising:
calibrating each sensor element by performing the method of,
locating a plurality of hot sensor elements experiencing high dark counts,
calculating average dark count values for the hot sensor elements;
calculating a temperature indicator based on the average dark count values,
deriving a nonlinear equation fitting the dark count values to the temperature indicator for the hot sensor elements,
calculating the dark count values for each remaining sensor element for a temperature indicator, and
deriving a nonlinear equation fitting the dark count values to the temperature indicator for each remaining sensor element;
reading coordinates for predetermined hot sensor elements in the array;
calculating the dark count for the hot sensor elements;
determining a temperature indicator based on the dark count for the hot sensor elements; and
calculating the dark count for all sensor elements based on the temperature indicator.

27. The computer readable medium of claim 26, wherein calibrating each sensor element further comprises excluding from calculation erroneous dark count values for hot sensor elements.

28. The computer readable medium of claim 26, wherein calculating the dark count for the hot sensor elements includes comparing the hot sensor elements to neighboring sensor elements during light exposure.

29. The computer readable medium of claim 26, further comprising evaluating the calibrating of each sensor element by performing the method of,
reading the coordinates for each hot sensor element,
calculating dark count values for a dark frame image for each hot sensor element,
calculating a temperature indicator based on the dark count values,
calculating dark count values for a dark frame image for each sensor element, and
comparing calculated dark count values with actual dark current values from the dark frame image.

* * * * *